United States Patent [19]

Elsner et al.

[11] 4,176,535

[45] Dec. 4, 1979

[54] APPARATUS FOR CROPPING, DIVIDING AND REDUCING ROLLED MATERIAL AT HIGH SPEED

[75] Inventors: Wolfgang Elsner, Ratingen; Werner Kalter, Duisburg; Rolf Michel, Drensteinfurt; Jörn Moslener, Dusseldorf, all of Fed. Rep. of Germany

[73] Assignee: DEMAG Aktiengesellschaft, Duisburg, Fed. Rep. of Germany

[21] Appl. No.: 902,955

[22] Filed: May 4, 1978

[30] Foreign Application Priority Data

May 5, 1977 [DE] Fed. Rep. of Germany ....... 2720136

[51] Int. Cl.² .................... B21B 1/00; B21B 41/00
[52] U.S. Cl. .................................... 72/10; 72/203; 72/228; 72/231; 83/105
[58] Field of Search ............... 72/10, 203, 228, 250, 72/231; 83/337, 105; 193/39

[56] References Cited

U.S. PATENT DOCUMENTS

| 2,251,596 | 8/1941 | O'Malley | 193/39 |
| 3,228,505 | 1/1966 | Leitner | 193/39 |
| 3,258,951 | 7/1966 | Kinnicutt, Jr. et al. | 72/203 |
| 4,027,565 | 6/1977 | Elsner et al. | 83/337 |

FOREIGN PATENT DOCUMENTS 1502723 7/1969 Fed. Rep. of Germany ............. 83/105

*Primary Examiner*—Milton S. Mehr
*Attorney, Agent, or Firm*—Mandeville and Schweitzer

[57] ABSTRACT

A combined apparatus is provided for handling rolled material issuing from a rolling mill finishing line. An arrangement is provided for cropping the head and tail ends of the rolled material running at high speed after it is divided into the desired lengths and for diverting the cropped lengths to a path separate from the cropped ends. Also, arrangements are provided for coordinating the actual speed of the issuing rolled material with the rotary shears for dividing the rolled material into lengths. In addition, arrangements are provided for the controlled chopping of the cropped ends in relation to the speed of the line.

2 Claims, 11 Drawing Figures

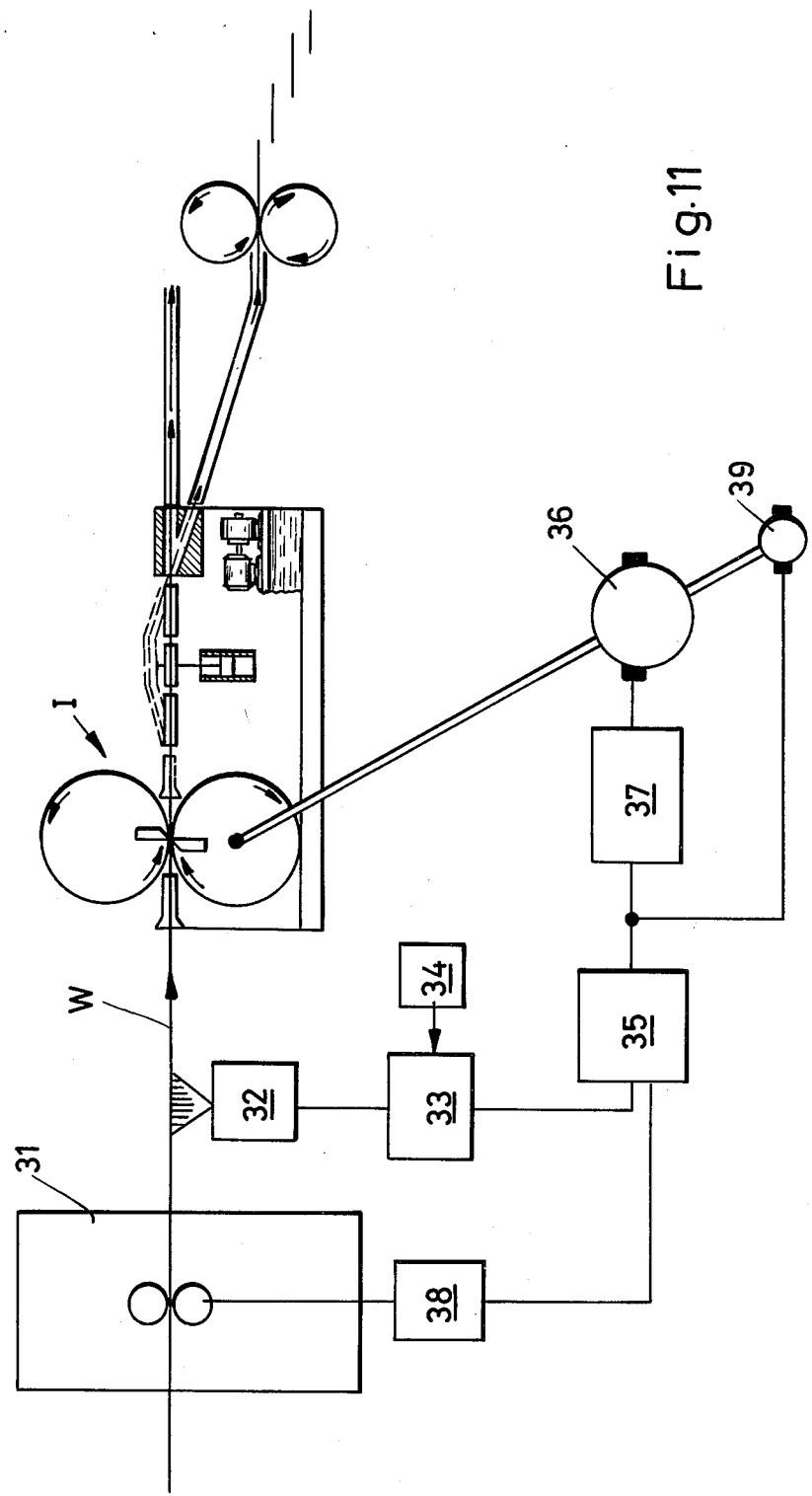

APPARATUS FOR CROPPING, DIVIDING AND REDUCING ROLLED MATERIAL AT HIGH SPEED

BACKGROUND AND STATEMENT OF THE INVENTION

The invention refers to an apparatus for cropping the head and tail ends of rolling material running at high speed, e.g., wire still warm from rolling. Modern wire rolling mills are today capable of rolling fine dimensions with discharge velocities of more than 50 m/sec. Wire blocks for velocities of 75 m/sec. or more are being constructed and designed. Cropping of the wire can be performed at the bundle as well as in the rolling line following the finishing train.

In the coiling station or after, the wire speed is low, but the coils are very close together. Automatic cutting can only be done with great variations in length. Optimum conditions afford a tolerance of one coil of roughly 3 m. In practical application, however, cutting inaccuracies of +2 coils (or nearly +4 coils, as minus tolerance is not permissible) must be calculated with, which means that at the front end and rear end the loss per bundle may be longer than the required minimum length of the end by 8 coils or roughly 24 m.

In the line following the finishing train, wire speeds are very high. However, each wire runs separately. With suitable shears the length of the end can be maintained more accurately. Also, removal and chopping of the ends is simplified. Shears as known heretofore, however, did not permit safe operation and relatively disturbance-free cutting at velocities exceeding 40 m/sec. The shears according to prior art which are used in the lines after finishing trains, were limited in their capacity due to the setting period required to bring the cutting blades into cutting position and to return them from the latter. The considerable acceleration and deceleration of the mass of blades to be moved, and of the displacement devices in revolving shears could not be controlled at such high speeds, so that such rotating shears could not be employed. In practical application, therefore, cutting is done on the line automatically as long as the shears run somewhat free of disturbances. At high rolling speeds, front and rear are cut by hand at the bundle station or at the hook track, or the wire is sold without ends being cut at respective losses, or the relatively great tolerances of bar head or bar end are accepted.

Another problem is the separation of divided rolling material following the shears onto different guide tracks such as, for example, towards the reel or towards scrap. The high rolling speeds demand switches for the rolling material, such switches being capable of guiding the rolling material strands arriving successively and divided by the shears quickly from one direction to another. Known switches of this type are not fast enough to allow for a change-over at very high rolling speeds after passage of the rear end of one strand and before entering of the front end of the following strand. It is, indeed, known to effect switching to another track for the next strand while the previous strand going to another track is still passing through, but to this end it is necessary to design the switch in such a way that the strand still running through the switch after change-over is not subject to excessive deflection. Measures must be taken to sheer the newly arriving strand head reliably to the new direction without having uncontrollable lateral swinging or a whip effect of the previously passing strand end.

A third problem presents itself in that the head and tail ends of the roller material usually cannot be used for further processing as they show various deviations from the required material quality, such as cross sectional flaws and over-rolling. It is known and common to sever the so-called crop ends and remove them from the rolling line. It is also known to divide such crop ends, which may be of considerable length, into short pieces to facilitate subsequent transportation and further processing.

In order to remove the crop ends from the rolling line, switches or the like are used which are arranged directly following the separating device. In order to create a space between crop piece and the rolling material strand permitting deflection of the crop piece from the rolling line, it is also known to provide so-called driving devices following the deflection device. The actual division of the crop ends is done by so-called choppers consisting, as a rule, of two drums or shafts which are provided at least at the circumference of one drum with isolated blades to chop up the rolling material passing between the drums. The driving devices arranged before the chopper consist, usually, also of two revolving drums whose peripheral velocity is somewhat greater than the passing velocity of the rolling material strand through the separating device. The rolling material is pulled away from between the drums of the driving device due to friction, whereby the drums of the driving device can be set in relation to the rolling material.

These arrangements have the disadvantage that the driving device and the chopper must be synchronized in such a way that material does not stagnate between the two, while on the other hand no excessive pull exists. In the first case, stagnated material would have considerable effects on the entire plant, extending all the way to the mill pass line. Secondly, excessive pull would tear the rolling material, and thus also lead to disturbance. The required synchronization of drives, regardless whether mechanical or electrical, is at any rate involved and expensive.

Another problem is the assessing of rolling material speed to adjust the peripheral speed of the rotary shears. It has been found that with the usual speed test by assessing the number of revolutions at the last rolling stand does not represent the actual velocity data of the rolling material passing through. Wear of the rollers and other factors of operation, which are not easily determined, permit slippage between rolling material and rollers so that the test data are no longer correct.

Based on the above problems it is the object of this invention to provide an apparatus to crop the head and tail ends of rolling material running at high speed, making it possible with the least structural means and a minimum of susceptibility to disturbance to safely handle the rolling material at very high speeds, to obtain clean and exact cutting of the wire strand, and to handle the distribution of the rolling material to continuing tracks at these high speeds without any disturbances. The apparatus contains means to remove the crop ends taken from the rolling line, such ends being reduced to chargeable pieces of scrap material. All parts of the apparatus lend themselves to adjusting and synchronizing to make possible an undisturbed operation of the entire plant at high velocities.

To solve this task, an apparatus of the initially described type is proposed which has the following combination of features:

(a) The rolling line following the finishing train is provided with rotary shears whose material guide drums, revolving at approximately the speed of rolling, are equipped with displaceable blades with are moved out of their inactive position within the drum to their cutting position. Servo-hydraulically controlled piston-cylinder units with succeeding servo-valves are provided as displacement drives for the blades, revolving with the latter and also arranged in the drums.

(b) The shears are followed by a power-operated switch before two or more continuing tubular guide tracks, with the guide tube of the switch consisting of flexibly connected straight tubes, whose outlet portion, along its longitudinal axis, swivels essentially around the intersection of the axes of the continuing guide tracks in the outlet area of such tube portion, to a position coaxial with the guide tracks, whereby the outlet side of the guide tube ends leaving a free space before the inlet openings of the diverging continuing guide tracks.

(c) One of the continuing guide tracks is followed by a chopper drive consisting of two drums arranged on a level and revolving at higher peripheral speed than the passing speed of the wire, whereby the circumference of at least one of the drums is provided with stationary blades to reduce the passing wire, and the space between the revolving drums is slightly smaller than the diameter of the passing wire.

(d) The finishing train is followed by a laser speed test apparatus testing the rolling material speed, and from its test value and the true value of the speed, as taken from the last rolling stand of the finishing train, a difference is derived which is fed to the drive of the rotary shears as correction of the ideal value.

The combination of the proposed structural parts of the apparatus make it possible to crop, separate and reduce the crop ends, with rolling material on the line at any rolling speeds attained today. The structural parts required to this end may be installed with a minimum of space required. The chopper drive can be placed next to or below the rolling pass line. The integration of all structural parts into one compact plant and the proposed test data assessment and control of peripheral velocity of the rotary shears depending on the actual rolling material passing speed guarantees optimum utilization of individual steps of operation. The proposed apparatus to crop, separate and reduce rolling material running at high speed may be included in new installations, but can also be incorporated in quick and simple fashion in existing wire mills. The structural parts used are simple so that the manufacturing costs for such installations are very low. The overall result is a compact plant not susceptible to disturbance which solves the task given in an outstanding manner.

Another feature of the invention provides that one of the continuing guide tracks is followed by a second power-operated switch according to detail (b) in claim 1, which is in turn arranged before two or more continuing tubular guide tracks. This proposal makes it possible to feed the separated wire to two or more reels or other processing stations.

An example of the invention is shown on the drawing as follows:

DESCRIPTION OF THE DRAWINGS

FIG. 11 is a schematic illustration of a speed control arrangement of the rotary shears II of FIGS. 1 and 2.

DETAILED DESCRIPTION OF THE INVENTION

Figure 1:
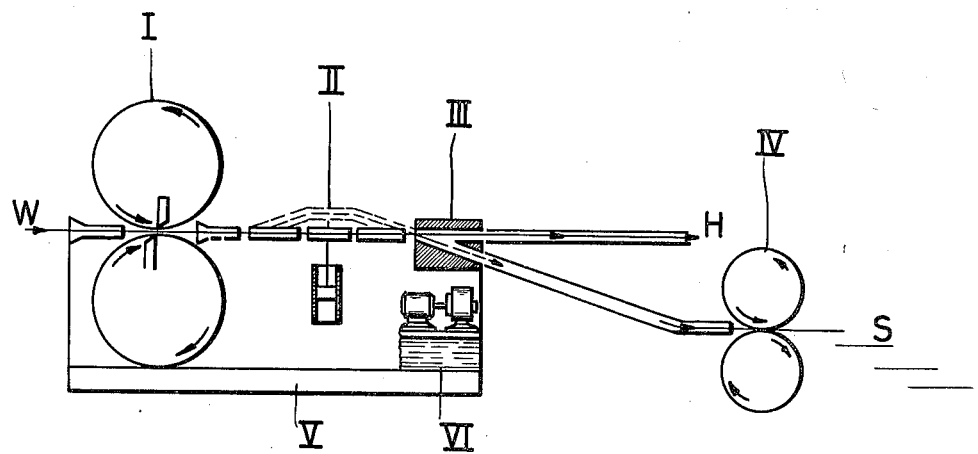
FIG. 1 is a somewhat diagrammatic side elevational view of apparatus illustrating the invention.

The apparatus of this invention for cropping, dividing and reducing rolled material, shown in FIG. 1, consists of the following structural parts, arranged on base plate V: shears I, switch II, and continuing guide tracks III feeding rolled material W to reel H and/or chopping device IV. Chopping device IV serves simultaneously as driving apparatus for passing rolled material W, pulling the rolled material from the shears-switch unit and feeding it as scrap S to a scrap bin which is not shown. Base plate V also accommodates hydraulic aggregates VI. Electric wiring for control and drive is housed in switch boxes (not shown), preferably located in a protected room.

Figure 2:
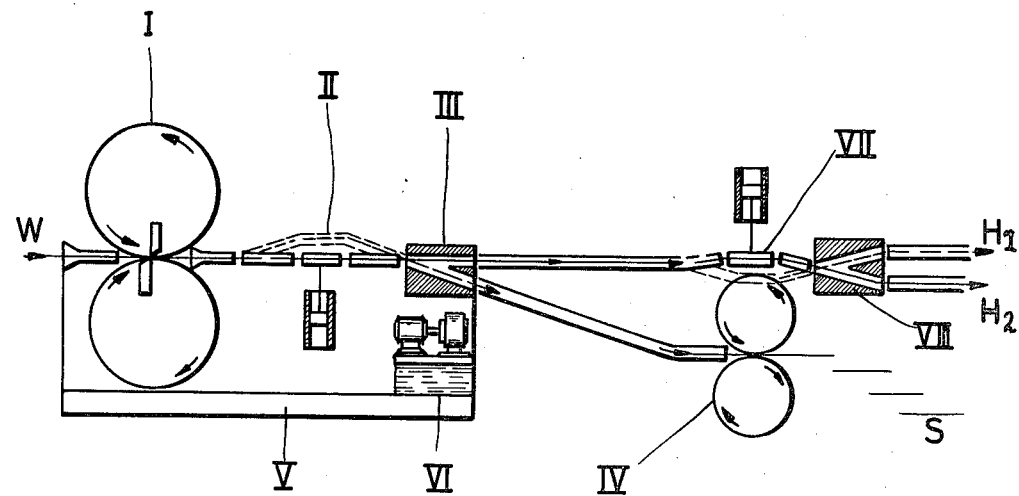
FIG. 2 is a view of apparatus similar to that of FIG. 1, but with an additional switch interposed for feeding rolled material to two reels.
Figure 4:
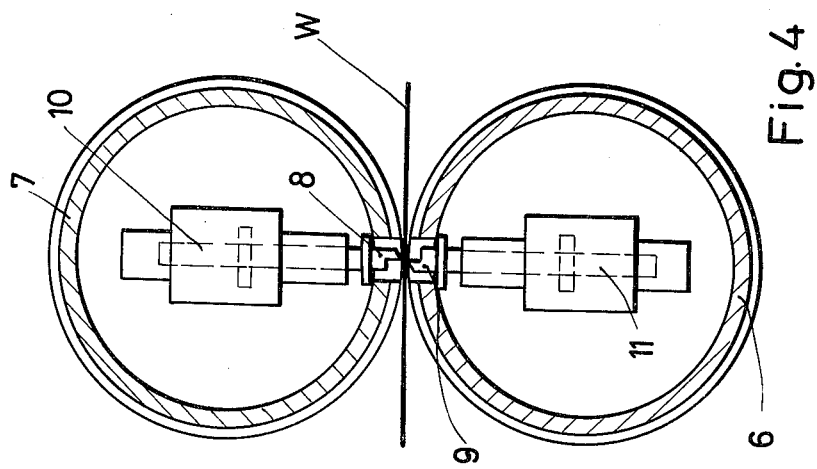
FIG. 4 is a somewhat diagrammatic view of the rotary shears of FIG. 3, showing the displacement apparatus for the shear blades.

FIG. 2 structurally matches apparatus according to FIG. 1 in essence, whereby an additional switch VII is provided, between one of the continuing guide tracks III and reel H, with guide tracks VIII distributing rolled material W onto two reels $H_1$ and $H_2$. The structural units of the apparatus as per invention are described in detail as follows.

Figure 3:
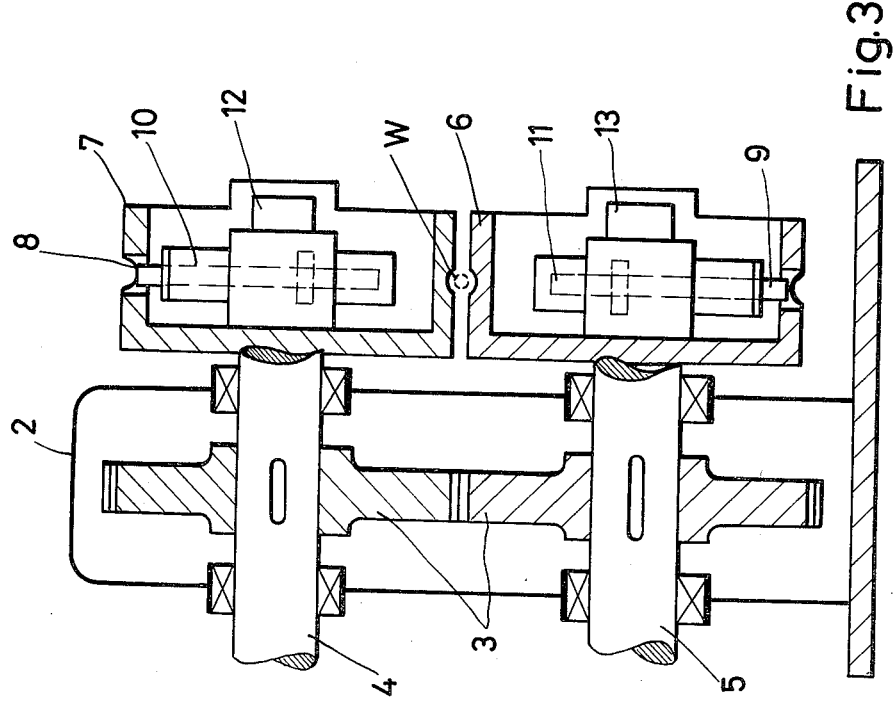
FIG. 3 is a cross sectional view of the rotary shears I of FIGS. 1 and 2.

FIG. 3 shows the shears I of the invention driven by transmission 3 arranged in casing 2. Rotating material guides 6, 7 are arranged in cantilever fashion on drive shafts 4,5. Blades 8, 9 are driven by means of piston-cylinder units 10, 11, which are controlled servo-hydraulically. Material guides 6, 7 rotate at very high speed roughly matching that of rolled material W. As soon as blades 8, 9 have finished the cutting process, the return movement starts which must be completed at the latest by the time the receiving openings for the blades in material guides 7, 6 enter the area of rolled material W. On the other hand, the blades may be ejected already when receiving openings for blades 8, 9 in material guides 6, 7 move away from the rolled material W so that nearly the time required for one rotation of the guide remains for the ejection process. By proper control of rotational speed of material guides 6, 7, the cut may be applied to any desired location along the rolled material W running at high speed. Due to the great speed for shifting of displacement drives 10, 11 for the blades the cutting process can be performed if wire speeds exceed 50 m/sec. However, wire speeds of 100 m/sec. seem attainable as well.

Rolled material W divided in the shears is fed to the switch schematically shown in FIGS. 5 through 8 through a stationary tubular guide 12 arranged behind the shears I. The actual switch consists of three straight pieces of tube 13, 14, 15 flexibly connected at their ends at G. Guide tube 13 through 15 is succeeded by continuing guide tracks III marked 16 and 17. To adjust the guide tube and thus switch II itself, a power drive is used consisting of piston cylinder unit 18 whose piston rod 19 engages at the center 14 of the guide tube.

Figure 5:
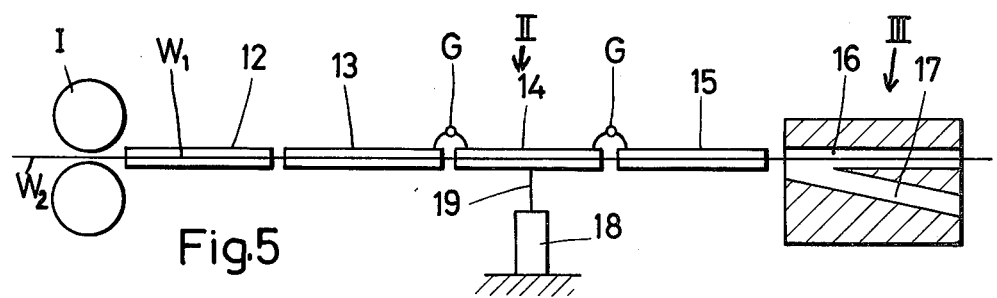
FIG. 5 is a schematic illustration of the switch II and continuing guide tracks III of FIGS. 1 and 2.

In FIG. 5, a first rolled material strand $W_1$ has passed through shears I where it has been severed from the following rolled material strand $W_2$. Strand $W_1$ passes through the guide tube sections aligned in succession and is fed to guide track 16 continuing in straight direction. Still during passage of strand $W_1$ through the switch, the latter is shifted according to FIG. 6, whereby guide tube section 15 aligns itself with branching continuing guide track 17.

Figure 6:
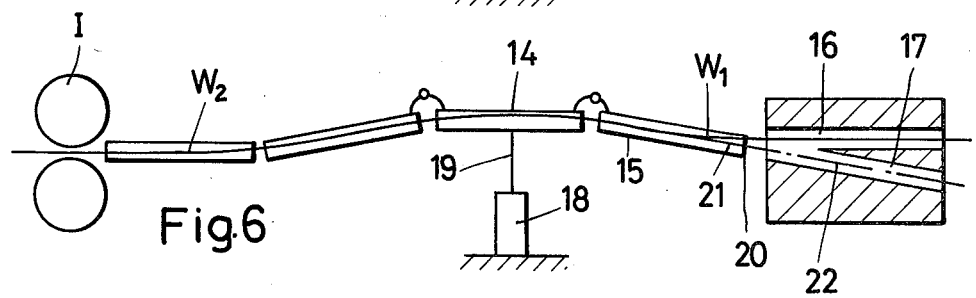
FIGS. 6–8 are views of the switch of FIG. 5 in various positions of operation.

FIG. 6 shows that this change-over takes place by moving the center part 14 of the guide tube at right angles against the original direction. This results in the swiveling of outlet guide tube section 15 around point 20 located at the front of such tube section, so that axis 21 of this tube section aligns with axis 22 of continuing guide track 17. Strand $W_1$ still passing through the continuing guide only undergoes slight deflection. However, as soon as the beginning of new strand $W_2$ leaves tube section 15, it enters continuing guide 17 at highest speed. This phase of the operation is shown on FIG. 7.

Figure 7:
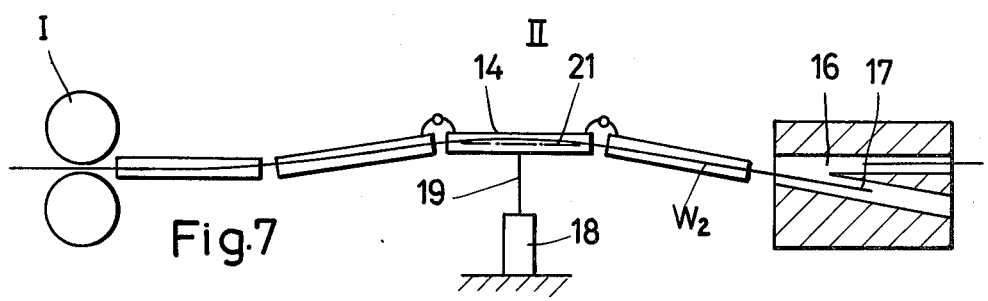
Figure 8:
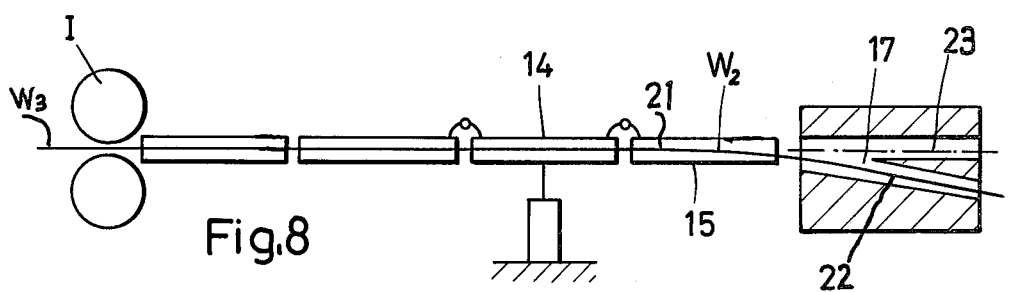

In preparation of the direction to be taken by strand $W_3$ switch I is shifted from the position of FIG. 7 to the position of FIG. 8 while strand $W_2$ is still passing through. This subjects strand $W_2$ to a slight deflection at or in tube section 14. The beginning of new strand $W_3$ leaves guide tube section 15 in the determined direction and enters continuing guide 16, since now axis 21 of tube section 15 is aligned with axis 23 of guide 16.

It is of particular advantage with the proposed switch that only a slight deflection occurs at the rolled material strand between outlet tube section 15 and the respective guide track upon shifting of the switch to the new direction. Since deflection only takes place to one side, the "whip effect" that would normally occur is eliminated, i.e., the violent knocking of the deflected strand end against the switch parts. It is advantageous to choose an angle of no more than 10° around which outlet guide tube section 15 is swivelable. Accordingly, axes 22 and 23 of guides 16 and 17 must also include an angle of 10° maximum. The structure of switch I schematically shown on the drawings is extremely simple, as it consists merely of flexibly connected tube sections which are shifted approximately in the center from a straight course to a roughly arched course.

Full use of shears I can only be made by means of Switch II which can functionally distribute rolled material W at the intended high speeds to continuing guide tracks 16, 17. Both structural parts I and II thus form a single unit solving the given task.

Figure 9:
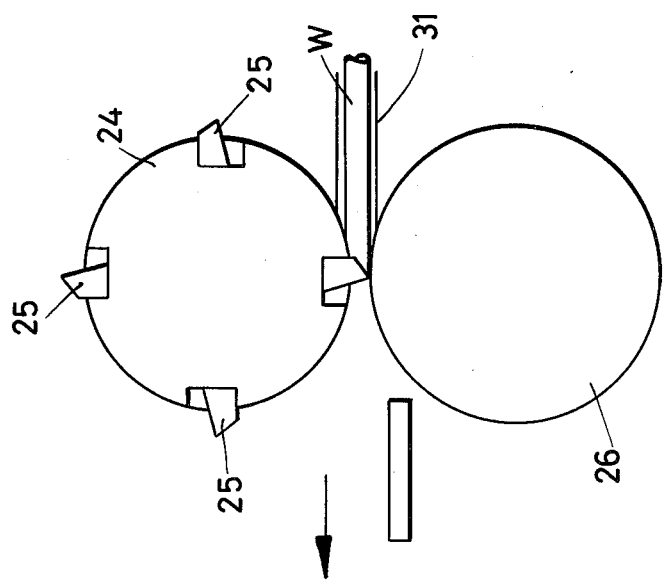
FIG. 9 is a somewhat diagrammatic side elevational view of the chopper IV of FIGS. 1 and 2.

It is necessary and common to separate head pieces from rolled material W and feed them in a reduced state to or towards scrap material. If rolled material speeds are very high, the apparatus to reduce rolled material W to scrap pieces S, arranged after the unit of shears and switch, must be designed so that it affords exact synchronization with the preceding apparatus. If such synchronization does not exist, material may stagnate before the reducing apparatus and such effect may be felt all the way to the rolling mill. FIG. 9 shows the apparatus to remove and reduce the head ends according to the invention in detail, marked I. Upper drum 24 carries blades 25, attached to and uniformly distributed over the circumference of drum 24. The cutting edges of blades 25 are parallel with the rotary axis of the drum. Lower drum 26 is shown in the example of FIG. 9 as a smooth drum, forming a so-called anvil for blades 25. Drum 26 may however, be provided with blades in the same manner as drum 24.

The passing rolled material W is pulled through the apparatus through drums 24 and 26 revolving at higher speeds, whereby drums 24 and 26 are spaced slightly closer together, than the thickness of the rolled material, thus carrying the latter along by means of friction fit. Simultaneously, the head ends are severed in the same apparatus into transportable scrap pieces S.

Figure 10:
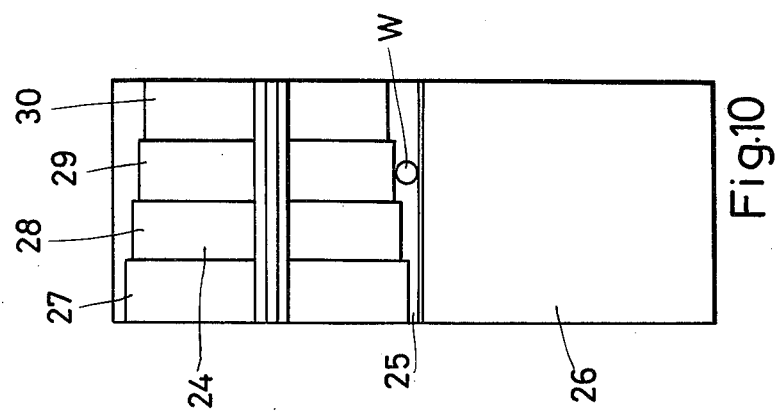
FIG. 10 is a view of the device of FIG. 9 from the right hand side thereof.

FIG. 10 shows a view of the apparatus according to FIG. 9, turned by 90°. FIG. 10 shows that upper drum 24 is provided with differential diameter stages 27 through 30, whereby the surfaces of stages 27 through 30 of drum 24 form differential gaps with the surface of smooth drum 26. These gaps are chosen in accordance with the diameters of the material rolled in the mill. Depending upon the cross section of the rolled material, it is fed by means of guide tube 31 to its predetermined gap on the drum. For example, stages 30 of drum 24 may be developed so that the gap remaining between this drum stage and drum 26 is greater than the cross section of the largest rolled material, thus making it possible to let samples pass through the apparatus without damage inflicted by drums 24 and 26.

FIG. 11 shows the regulator synchronizing rolled material passing speed and rotary shears rotational speed. 31 stands for the last roller stand of the finishing mill. Wire W leaving rolling stand 31 enters shearing unt I. Rolling stand 31 is succeeded by laser speed test apparatus 32 assessing the actual speed of the wire. The resulting test valve is converted, in evaluation unit 33, into an analogous potential in proportion with the velocity. The evaluation unit 33 is joined by internal calibration controls 34 by means of which a certain velocity can be matched with a certain potential. Simultaneously, true value 38 of the speed from last rolling stand 31 is assessed and also converted to an analogous potential. As a rule, this speed does not represent the actual rolled material speed because of, for example, slippage between rolled material W and rollers.

Both speed test values as analogous potentials are compared to theoretical value component 35 for the control of shear drive 36, and the difference is compared with the true value from the last stand to produce the desired theoretical value. The theoretical value thus obtained serves to regulate rotational speed 37 of shears drive 36 whose number of revolutions is assessed by tacho-generator 39 and permits exact setting of rotational speed of rotary shears with passing speed of the rolled material. Blades 9 synchronously plunge into rolled material W to be severed. This is a prerequisite for safe cutting of thin wires at high temperatures and velocities. This serves to eliminate uncertainties resulting from merely taking the theoretical value for the speed of the last rolling stand with respect to stagnation or pull during the severing process.

Once rolled material W has left the rolling mill, the last test value of laser test apparatus 32 is stopped, and the shearing unit will follow the action of the last rolling stand 31. Test target constant, and the control period must be extremely short for the beginning of the wire, so that the correction for the first cuts of a new wire can take effect.

The unit proposed is characterized by a multitude of advantages, outstanding being the capacity for high speeds in operation of the plant. Furthermore, simple structural parts cause a minimum of cost, and wear of the installation parts is insignificant. Contrary to existing wire shears, severing by the shears results in clean, blunt wire ends, hardly deformed at all, thus largely eliminating any interferences resulting from the handling of the wire bundles caused by sharp, protruding spears. The entire unit may be easily installed in existing wire mills.

We claim:

1. Apparatus for cropping, dividing and chopping rolled material running at high speed from the finishing line of a rolling mill, the combination characterized by
   (a) rotary shears disposed in the rolling line of said mill after said finishing line;
   (b) said rotary shears including
      (1) opposed rotary drums;
      (2) opposed radially displaceable cooperating cutter blades in said drums;
      (3) reversible fluid acting piston and cylinder units in each said drum for displacing said blades from a non-cutting position in said drums to a cutting position extending partially from said drums;
      (4) fluid acting servo valves in each said drum for controlling respective piston and cylinder units therein;
   (c) a power operated switch in said rolling line after said rotary shears; said switch for directing successive ones of severed rolled material pieces to two continuing guides, the switch being movable from a first position to a second position while still guiding a rolled piece in the first postion;
   (d) said switch including
      (1) a guide tube comprised of a plurality of flexibly connected straight tube sections;
      (2) the axis of the outlet portion of said guide tube movable from said first position coaxial with one continuing guide to said second position coaxial with the second continuing guide and vice versa;
      (3) the outlet end of said outlet portion being spaced from the inlet end of each of said continuing guides;
   (e) a chopper in said line after one of said continuing guides;
   (f) said chopper including
      (1) a pair of opposed rotatable chopper drums;
      (2) means for rotating said drums at a peripheral speed greater than the speed of rolled material passing therethrough;
      (3) at least one of said pairs of drums having fixed cutter blades over the surface thereof for chopping rolled material passing therethrough;
      (4) a space between said opposed drums smaller than the diameter of rolled material passing therethrough;
   (g) a laser speed test apparatus in said rolling line before said rotary shears; and
   (h) said laser speed test apparatus including
      (1) first means for testing the speed of rolled material passing therethrough;
      (2) second means for testing the actual speed of the last rolling stand in said mill;
      (3) means for correlating the results of said first and second test means for controlling the speed of said rotary shears.

2. The apparatus of claim 1, further characterized by
   (a) a second power operated switch in said rolling line;
   (b) said second power operated switch positioned in said rolling line after one of the continuing guides of said power operated switch of paragraph (c) of claim 1; and
   (c) said second power operated switch being the same as said power operated switch of paragraph (c) of claim 1.

* * * * *